Figure 1:
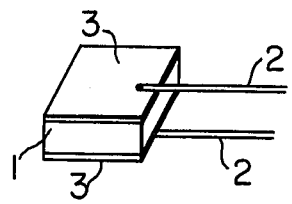

United States Patent [19]

Matsushita et al.

[11] Patent Number: 4,467,309
[45] Date of Patent: Aug. 21, 1984

[54] HIGH TEMPERATURE THERMISTOR

[75] Inventors: Yasuo Matsushita; Kousuke Nakamura; Mitsuru Ura, all of Hitachi, Japan

[73] Assignee: Hitachi, Ltd., Tokyo, Japan

[21] Appl. No.: 371,571

[22] Filed: Apr. 26, 1982

[30] Foreign Application Priority Data

Apr. 30, 1981 [JP] Japan .................................. 56-64151

[51] Int. Cl.³ .............................................. H01C 7/04
[52] U.S. Cl. ...................... 338/22 R; 338/25; 252/516
[58] Field of Search ................. 338/22 R, 22 SD, 25, 338/308, 309; 252/518, 516

[56] References Cited

U.S. PATENT DOCUMENTS

| | | | |
|---|---|---|---|
| 2,916,460 | 12/1959 | Van Der Beck | 338/22 R |
| 3,157,541 | 11/1964 | Heywang et al. | 148/175 |
| 3,735,321 | 5/1973 | Bovenkerk | 338/22 SD |
| 3,993,602 | 11/1976 | Prochazka | 252/516 |
| 4,023,975 | 5/1977 | Prochazka | 106/44 |
| 4,086,559 | 4/1978 | Knippenberg et al. | 338/22 R |
| 4,147,572 | 4/1979 | Vadakov et Al. | 148/175 |
| 4,208,449 | 6/1980 | Knippenberg et al. | 338/22 R X |
| 4,359,372 | 11/1982 | Nagai et al. | 338/22 SD |

*Primary Examiner*—Roy N. Envall, Jr.
*Assistant Examiner*—Christopher N. Sears
*Attorney, Agent, or Firm*—Antonelli, Terry & Wands

[57] ABSTRACT

A high-temperature thermistor comprising, a polycrystalline sintered body consisting essentially of 0.1-8 weight percents of at least one kind selected from the group consisting of Be, BeO, Be$_2$C, B, BN, B$_2$O$_3$ and B$_4$C which weight percents are calculated as the amount of only Be or B single substance from net amount, the balance SiC, and the inevitable impurities having not more than 2 weight percents of SiO$_2$, not more than 0.1 weight percent of Al, not more than 0.2 weight percents of Fe, not more than 1 weight percent of Si, and not more than 0.4 weights percents of free carbon, a pair of electrode provided on the surfaces of the sintered body, and lead wires each connected to the respective electrodes, and a method of producing same.

7 Claims, 2 Drawing Figures

HIGH TEMPERATURE THERMISTOR

The present invention relates to a high-temperature thermistor which is a kind of a temperature-sensitive resistor.

Thermistors are ceramic temperature sensors utilizing the highly temperature-dependent property of their electrical resistance and are widely used for such applications as temperature measurement and temperature control. The practical operating temperature of a thermistor depends on the working resistance and stability of the resistance value, and high-temperature thermistors are used generally in temperature ranges of 300°–1000° C.

Conventional high-temperature thermistor elements include those based on spinel, perovskite or zirconia and some of them have been put into practical use. Such thermistor materials, however, have drawbacks in that although they show relatively stable characteristics in temperature ranges up to about 500° C., they lack in time-stability of resistance in temperature ranges of not lower than 700° C., causing difficulties in putting them to practical use. Investigations have also been made to use single crystals of silicon carbide for high-temperature thermistors, but they are not in practical use on the ground that the characteristics vary widely and the single crystals can not be prepared easily. It is also known, in U.S. Pat. No. 4,023,975, to use a polycrystalline sintered body composed of silicon carbide and beryllium carbide as a temperature sensor. However, the electrical resistivity of the sintered body is 29Ω cm at room temperature and, in a temperature range of 500°–1000° C., the electrical resistance is even lower and the change of electrical resistance with temperature (thermistor constant) is low. Accordingly, such sintered body can not be used as a high-temperature thermistor. Also, a polycrystalline sintered body composed of silicon carbide and boron is described in U.S. Pat. No. 2,916,460. However, the sintered body can not be used as a high-temperature thermistor because of the extremely low electrical resistance in the temperature range of 500°–1000° C. and low thermistor constant.

The object of the present invention is to provide a high-temperature thermistor having a high thermistor constant and showing small change in electrical resistance with time.

The present inventors have disclosed, in U.S. Pat. No. 4,370,421, "Electrically Insulating Substrate and Method of Making Such Substrate", filed on Nov. 5, 1980, that a sintered body composed of at least one member selected from the group consisting of Be, a Be-containing substance, B and a B-containing substance with the balance being SiC and unavoidable impurities can be used as an insulator at room temperature. The present inventors have found that the sintered body can be used as a high-temperature thermistor, that is, it has excellent characteristics as a high-temperature thermistor, including an appropriate electrical resistance and a high thermistor constant in the temperature range of 500°–1000° C. together with small aging change in resistance value with the lapse of time, and that the above-mentioned disadvantages of the conventional thermistors can be overcome by using such sintered body discovered by the present inventors.

The high-temperature thermistor according to the present invention comprises a sintered body composed of silicon carbide as a main constituent and containing at least one kind selected from the group consisting of Be, BeO, Be$_2$O, B, BN, B$_2$O$_3$ and B$_4$C in an amount of 0.1–8 weight %, which amount is shown as the amount of only Be or B changed or calculated from net amount, and impurities of not more than 2 wt % of SiO$_2$, not more than 0.4 wt % of free carbon, not more than 0.1 wt % of Al, not more than 0.2 wt % of Fe, and not more than 1 wt % of Si (the last three kinds being impurities existing as single substance of metal other than Be), or preferably impurities of substantial zero of free carbon, not more than 1 wt % of SiO$_2$, not more than 0.05 wt % of Al, and not more than 0.1 wt % of Fe.

To obtain the above-mentioned sintered body, a powder of silicon carbide is admixed with a predetermined amount of powder of at least one kind selected from the group consisting of Be, BeO, Be$_2$C, B, BN, B$_2$O$_3$ and B$_4$C, such amount being 0.1–8 weight % when calculated as the amount of only Be or B from net amount, to form a mixture. In the mixture there are impurities of not more than 2 wt % of SiO$_2$, not more than 0.4 wt % of free carbon, not more than 0.1 wt % of Al, not more than 0.2 wt % of Fe and not more than 1 wt % of Si or preferably impurities of substantial zero of free carbon, not more than 1 wt % of SiO$_2$, not more than 0.05 wt % of Al, and not more than 0.1 wt % of Fe.

To the above-mentioned mixture is admixed a solution of 10 to 30 wt % as a binder which solution is prepared by diluting silicone resin with an organic solvent to thereby prepare a granulated admixture. The resulting granulated admixture is pressure-molded to form a compact, which is then hot pressed under a vacuum of $10^{-3}$–$10^{-4}$ Torr and sintered at a temperature ranging from 1900° to 2300° C. for a period of time ranging from 0.1 to 4 hours to obtain a molded body. After machining the sintered body to have a desired shape and desired dimensions, electrodes are provided on the surfaces of the sintered body by metallizing technique and lead wires are bonded to the respective electrodes, to obtain a high-temperature thermistor according to the present invention. It is preferred that the sintered body has a relative density of at least 95% regarding the theoretical density thereof. When the relative density of the sintered body is lower than 95% in comparison with the theoretical density, the resistance value is varied largely when a thermistor produced therefrom is used at high temperatures for a long period of time, which is unacceptable as a thermistor. It is preferred that the above-mentioned powder has an average particle size of not larger than 3 μm. The organic solvent is preferably of xylene. The xylene solvent is preferably 30 to 70 volume % regarding silicone of one volume rate. Further, it is preferred to cover the elements of the thermistor with ceramics and particularly with glass so as to protect the elements from high temperature atmosphere.

The above-mentioned high-temperature thermistor according to the present invention has a resistance of about 1 kΩ at 700° C. or 1000° C., a thermistor constant of 10,000–16,000 in a temperature range of 500°–700° C., and a rate of change in resistance of not more than 3% during use at temperatures of 500°–1000° C. for a long period of time. Accordingly, the thermistor of the present invention has excellent characteristics as a high-temperature thermistor.

Addition of at least one member selected from the group consisting of Be, BeO, Be$_2$C, B, BN, B$_2$O$_3$ and B$_4$C to silicon carbide has a favorable effect on obtaining a high-density sintered body of silicon carbide which itself is hard to be sintered. Furthermore, the resulting sintered body has such a resistance and a thermistor constant that the thermistor comprised of the sintered body can be put into practical use as a high-temperature thermistor. Particularly preferable additive ingredients are beryllium oxide (BeO) and boron nitride (BN). The relationship between the amount of additive ingredients and the thermistor characteristics shows a little dependence on the kind or the combination of the additives. When the amount of additive ingredients calculated as the amount of only Be or B from net amount, is more than 8 weight % regarding the total amount of the sintered body, the aging change in resistance is caused with the lapse of time in an oxidizing atmosphere at a high temperature and the thermistor constant increases, with the result of degraded value of accuracy of temperature detection. On the other hand, when the amount of additive ingredients calculated as the amount of only Be or B from net amount is less than 0.1 weight %, it is difficult to obtain a sintered body with a high density and there is a tendency of resistance value and thermistor constant to scatter largely.

Other features and advantages of the present invention will be more clearly understood by reading the following description of embodiments, referring to the attached drawings.

Figure 2:
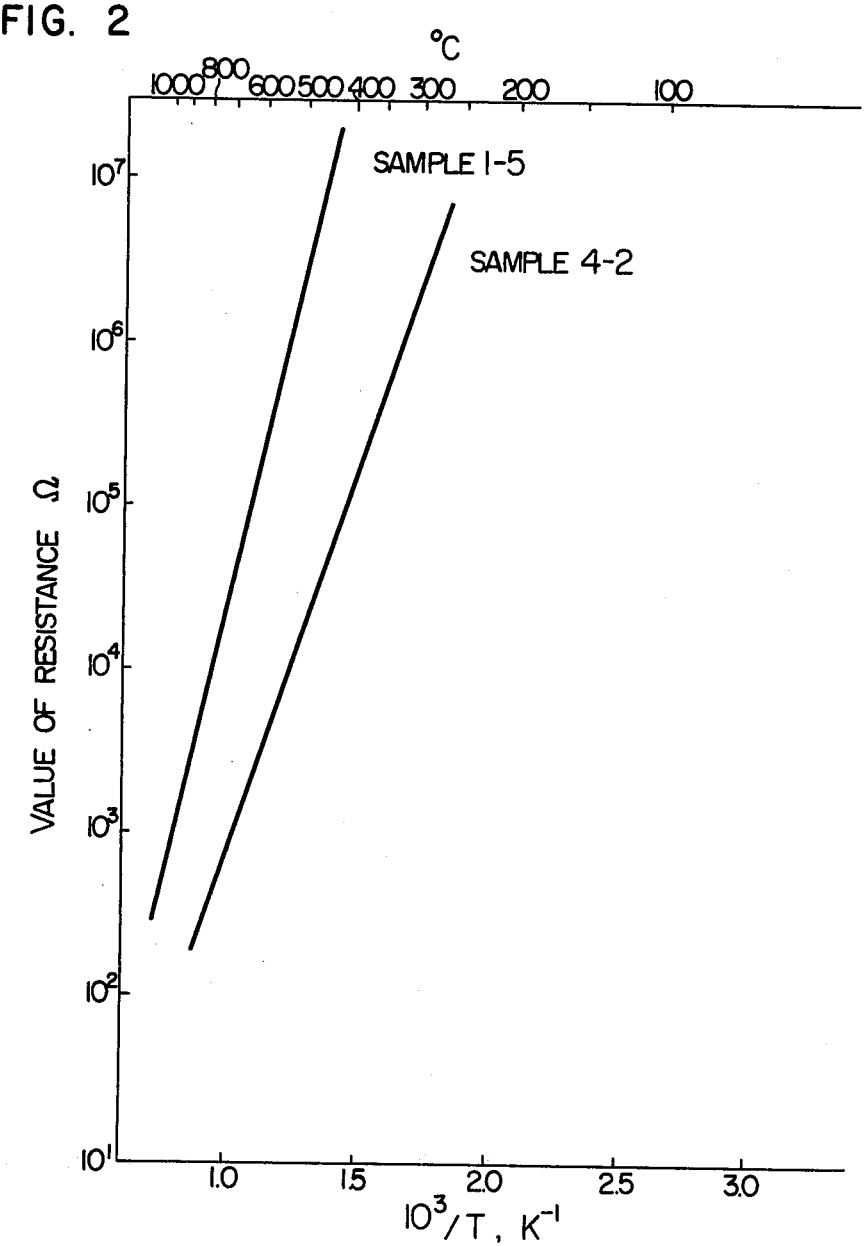

FIG. 1 is a perspective view of an embodiment of a high-temperature thermistor according to the present invention, and FIG. 2 is a graph showing a relation between the value of electric resistance and the reciprocal of temperature.

EXAMPLE 1

To a silicon carbide powder consisting essentially of 0.57 wt % of free Si, 0.08 wt % of free C, 0.054 wt % of Fe, 0.022 wt % of Al and the balance SiC which powder has average grain size of 2 $\mu$m was added beryllium oxide of 0.05–20 wt % having average grain size of 0.23 $\mu$m which weight percent value is calculated as the amount of only Be single substance from the net amount of BeO. Then, there was added an organic binder consisting of 50 parts of silicone resin and 50 parts of xylene liquid, and the whole was mixed sufficiently. The resulting raw material was pressure-molded at a pressure of 1000 kg/cm$^2$ to obtain a compact having a diameter of 50 mm and a thickness of 2 mm. The compact was then sintered for one hour by using a vacuum hot press means and under the conditions of vacuum of $10^{-5}$–$10^{-4}$ Torr, pressure of 300 kg/cm$^2$ and a temperature of 2050° C., to obtain a sintered silicon carbide body (about 1 mm thick). After slightly grinding both faces of the disc-shaped sintered body, a film of nickel (3) for constituting an electrode was provided on each of the ground surfaces by metallizing. The thus treated sintered body was cut into 1 mm×1 mm×1 mm chips (1) by a diamond cutter and then platinum wires (2) were welded thereto by spot welding to obtain thermistor elements.

The characteristics of the thus obtained thermistor elements are shown in Table 1. The elements containing 0.1–8 weight % of beryllium have such resistance values at 1000° C. and such thermistor constants (800°–1000° C.) that they are suitable for use as high-temperature thermistors.

In contrast with the above, when the beryllium content of the element is less than 0.1 weight %, the relative density of the sintered body is low, that is, 90% or below, and both resistance value and thermistor constant tend to very largely from chip to chip. On the other hand, when the beryllium content exceeds 8 weight %, resistance value and thermistor constant are increased, resulting in a lower accuracy of detection measurement.

The elements having various values in beryllium content were subjected to a heating test which comprises heating at 1000° C. for 1000 hours. The test results, shown in Table 1, indicate that the resistance variation rate (percent variation of resistance value brought about from the heating in the test) is low, i.e., 3% or below for the elements containing 0.1–8 weight % of beryllium. On the other hand, a beryllium content in excess of 8 weight % leads to a resistance variation rate of higher than 3% and hence a poor high-temperature stability was caused.

EXAMPLE 2

To the same silicon carbide powder as used in Example 1, a powder of boron nitride having average grain size of 0.5 $\mu$m was added in amounts of 0.05–20 weight % which is calculated as the amount of only B single substance from net amount of BN, to obtain particulate compositions. These compositions were treated in the same manner as in Example 1 to obtain thermistor elements, which had the characteristics shown in Table 2. The elements containing 0.1–8 weight % (calculated as B) of BN had resistance values (at 1000° C.) and thermistor constants (800°–1000° C.) which are compatible with those obtained in Example 1 and suitable for practical use of the elements. In addition, the resistance variation rates of these elements under heating at high temperature were low, 3% or below, indicating that these elements have excellent characteristics as high-temperature thermistors. However, when the beryllium content of the element was lower than 0.1 weight %, density of the sintered body and uniformity of characteristics were reduced. On the other hand, when the beryllium content exceeds 8 weight %, the accuracy of temperature measurement and the aging stability at high temperatures were degraded.

EXAMPLE 3

A thermistor element was prepared by the same procedure as in Example 1 except that both beryllium oxide having average grain size of 0.23 $\mu$m and boron nitride having average grain size of 0.5 $\mu$m were added to the silicon carbide powder in amounts of 1 weight % (as Be) and 1 weight % (as B), respectively, when preparing powder compositions. The element had a resistance value of 1.2 k$\Omega$ at 1000° C., a thermistor constant (800°–1000° C.) of 14300 and a resistance variation rate (under heating at 1000° C. for 1000 hours) of not higher than 3%. These values indicate that the element is a high-temperature thermistor having excellent characteristics over a temperature range of 800°–1000° C.

EXAMPLE 4

Three kinds of compositions were prepared by respectively using boron (B), boron oxide (B$_2$O$_3$) and boron nitride (BN) all of which have average grain size of 0.5 $\mu$m as a single additive to a silicon carbide powder, in amounts of 1–4 weight % calculated as only the amount of B. Using the same method as in Example 1, thermistor elements were produced from the compositions. The characteristics of the elements containing the respective additives are shown in Table 3.

TABLE 1

| Specimen No. | Content of additive, Be (%) | Relative density of sintered body (%) | Resistance at 1000° C. (kΩ) | Thermistor constant (500–1000° C.) | Resistance change rate upon heating 1000° C., 1000 h (%) | Electric resistivity at room temp. (Ω·cm) |
|---|---|---|---|---|---|---|
| 1-1 | 0.05 | 88.5 | 0.65 | 9,400 | +2.5 | $10^7$ |
| 1-2 | 0.1 | 95.3 | 1.23 | 13,750 | +2.7 | $10^8$ |
| 1-3 | 0.5 | 97.6 | 1.05 | 15,300 | +2.3 | $>10^{13}$ |
| 1-4 | 1 | 98.5 | 1.16 | 15,150 | +2.0 | $>10^{13}$ |
| 1-5 | 2 | 99.4 | 1.18 | 15,420 | +1.7 | $>10^{13}$ |
| 1-6 | 4 | 100 | 1.26 | 15,700 | +2.3 | $>10^{13}$ |
| 1-7 | 8 | 100 | 1.33 | 15,730 | +2.6 | $>10^{13}$ |
| 1-8 | 15 | 99.2 | 2.34 | 17,240 | +3.6 | $>10^{13}$ |
| 1-9 | 20 | 98.7 | 3.53 | 19,300 | +4.0 | $>10^{13}$ |

TABLE 2

| Specimen No. | Content of additive, B (%) | Relative density of sintered body (%) | Resistance at 1000° C. (kΩ) | Thermistor constant (500–1000° C.) | Resistance change rate upon heating 1000° C., 1000 h (%) | Electric resistivity at room temp. (Ω·cm) |
|---|---|---|---|---|---|---|
| 2-1 | 0.05 | 87.3 | 0.56 | 8,750 | +3.0 | $10^7$ |
| 2-2 | 0.1 | 92.4 | 0.83 | 13,600 | +2.6 | $10^8$ |
| 2-3 | 0.5 | 95.7 | 1.02 | 13,800 | +2.5 | $>10^{11}$ |
| 2-4 | 1 | 98.5 | 1.07 | 13,850 | +2.5 | $>10^{11}$ |
| 2-5 | 2 | 99.9 | 1.11 | 14,030 | +2.3 | $>10^{11}$ |
| 2-6 | 4 | 100 | 1.15 | 14,000 | +2.4 | $>10^{11}$ |
| 2-7 | 8 | 99.2 | 1.23 | 15,300 | +2.7 | $>10^{11}$ |
| 2-8 | 15 | 98.7 | 2.59 | 16,900 | +3.4 | $>10^{11}$ |
| 2-9 | 20 | 98.8 | 3.78 | 18,700 | +5.1 | $>10^{11}$ |

TABLE 3

| Specimen No. | Content of additive, [additive] (% as B) | Relative density of sintered body (%) | Resistance at 700° C. (kΩ) | Thermistor constant (500–700° C.) | Resistance change rate upon heating 700° C., 1000 h (%) | Electric resistivity at room temp. (Ω·cm) |
|---|---|---|---|---|---|---|
| 4-1 | 1 [B] | 98.5 | 0.85 | 10,700 | +2.4 | $>10^{11}$ |
| 4-2 | 2 [B] | 99.5 | 1.05 | 10,650 | +2.4 | $>10^{11}$ |
| 4-3 | 4 [B] | 99.3 | 1.03 | 10,830 | +2.3 | $>10^{11}$ |
| 4-4 | 1 [$B_2O_5$] | 98.7 | 1.05 | 10,500 | +2.7 | $>10^{11}$ |
| 4-5 | 2 [$B_2O_5$] | 99.3 | 1.11 | 11,200 | +2.5 | $>10^{11}$ |
| 4-6 | 4 [$B_2O_5$] | 99.5 | 1.07 | 11,200 | +2.5 | $>10^{11}$ |
| 4-7 | 1 [$B_4C$] | 98.9 | 1.00 | 11,700 | +2.3 | $>10^{11}$ |
| 4-8 | 2 [$B_4C$] | 100 | 1.23 | 11,500 | +2.6 | $>10^{11}$ |
| 4-9 | 4 [$B_4C$] | 99.2 | 1.21 | 11,400 | +2.7 | $>10^{11}$ |

These elements had resistance values of 0.8–1.2 kΩ at 700° C. and thermistor constants (500°–700° C.) of about 11,000, indicating that they are high-temperature thermistors suitable for application in a temperature range of 500°–700° C. In addition, a heating test comprising heating the elements at 700° C. for 1000 hours gave resistance variation rates of not higher than 3%, showing that the elements are excellent in aging stability at high temperatures. FIG. 2 shows a relation between the electric resistance value and the reciprocal of temperature value. As shown in FIG. 2, very large variation in electric resistance with respect to temperature variation can be obtained from the element of the present invention, that is, the element of the present invention has excellent characteristics as high temperature thermistor.

Accordingly, the thermistor of the present invention is characterized by a high thermistor constant and a less tendency of resistance value to vary with the lapse of time during heating at high temperatures. In addition, since the thermistor elements according to the invention is composed of a sintered silicon carbide body of high purity and high density, it has such characteristic features as high thermal resistance, high mechanical strength, high thermal shock resistance and therefore high durability. Furthermore, the sintered body has a coefficient of thermal conductivity of 0.15–0.75 cal/cm-·sec·°C. which corresponds to 10 or more times of those of oxide-based thermistors, and the element can be formed into a small size and is highly excellent in heat response speed because of its low heat capacity.

As stated hereinabove, the thermistor comprising a silicon carbide body according to the present invention has excellent characteristics and provides a high-temperature type thermistor suitable for use in a high temperature range of 700°–1000° C., which thermistor would be hard to obtain so far as prior art is concerned.

What is claimed is:

1. A high-temperature thermistor comprising:
a polycrystalline sintered body consisting essentially of 0.1–8 weight percent of at least one kind selected from the group consisting of Be, BeO, $Be_2C$, B, BN, $B_2O_3$ and $B_4C$, which weight percent is calculated as the amount of only Be or B single substance from net amount, the balance SiC, and the inevitable impurities having not more than 2 weight percent of $SiO_2$, not more than 0.1 weight percent of Al, not more than 0.2 weight percent of Fe, not more than 1 weight percent of Si, and not more than 0.4 weight percent of free carbon, said sintered body having an electric resistivity of not less than $10^7 \Omega \cdot$cm at room temperature, a pair of electrodes provided on the surfaces of the polycrystalline sintered body, and lead wires, one end of each of said lead wires being connected to each of the electrodes.

2. A high-temperature thermistor comprising:

a polycrystalline sintered body consisting essentially of 0.1–8 weight percent of at least one kind selected from the group consisting of Be, BeO, $Be_2C$, B, BN, $B_2O_3$ and $B_4C$ which weight percent is calculated as the amount of only Be or B single substance from net amount, the balance SiC, and the inevitable impurities having not more than 2 weight percent of $SiO_2$, not more than 0.1 weight percent of Al, not more than 0.2 weight percent of Fe, not more than 1 weight percent of Si, and not more than 0.4 weight percent of free carbon, the relative density of said sintered body being at least 95 percent, said sintered body having a thermistor constant of 10000–16000 for a temperature range of 500°–700° C., and exhibiting an electrical resistance variation rate of not higher than 3% when used for a long period of time at temperatures of 500°–1000° C. and an electric resistivity of not less than $10^7 \Omega \cdot$cm at room temeprature, a pair of electrodes provided on the surfaces of the polycrystalline sintered body, and lead wires, one end of each of said lead wires being connected to each of the electrodes.

3. A high-temperature thermistor comprising:

a polycrystalline sintered body consisting essentially of about 0.28–about 22.3 weight percent of BeO the balance SiC, and the inevitable impurities having not more than 2 weight percent of $SiO_2$, not more than 0.1 weight percent of Al, not more than 0.2 weight percent of Fe, not more than 1 weight percent of Si, and not more than 0.4 weight percent of free carbon, the relative density of said sintered body being at least 95 percent, said sintered body having a thermistor constant of 1000–1600 for the temperature range of 500°–1000° C. and an electrical resistance value at 1000° C. of 1–1.5 k$\Omega$, said sintered body exhibiting an electrical resistance variation rate of not higher than 3% after being heated for 1000 hours at 1000° C. and an electric resistivity of not less than $10^7 \Omega \cdot$cm at room temperature, a pair of electrodes provided on the surfaces of the polycrystalline sintered body, and lead wires, one end of each of said wires being connected to the respective electrodes.

4. A high-temperature thermistor comprising:

a polycrystalline sintered body consisting essentially of about 0.23–about 18.38 weight percent of BN, the balance SiC, and the inevitable impurities having not more than 2 weight percent of $SiO_2$, not more than 0.1 weight percent of Al, not more than 0.2 weight percent of Fe, not more than 1 weight percent of Si, and not more than 0.4 weight percent of free carbon, the relative density of said sintered body being at least 95 percent, said sintered body having a thermistor constant of 10000–16000 for the temperature range of 500°–1000° C. and an electrical resistance value at 10000° C. of 1–1.4 k$\Omega \cdot$cm at room temperature, a pair of electrodes provided on the surfaces of the polycrystalline sintered body, and lead wires, one end of each of said wires being connected to the respective electrodes.

5. A high-temperature thermistor according to any one of claims 1 to 4, wherein the electrodes are made of Ni.

6. A high-temperature thermistor according to any one of claims 1 to 4, wherein the lead wires are of platinum or nickel.

7. A high-temperature thermistor according to any one of claims 1 to 4, wherein the polycrystalline sintered body has a coefficient of thermal conductivity of 0.15–0.75 cal/cm·sec·°C.

* * * * *